United States Patent
Benedict et al.

(10) Patent No.: US 9,903,699 B2
(45) Date of Patent: Feb. 27, 2018

(54) APPARATUS FOR THE COMPUTER ASSISTED SETUP OF A MACHINE TOOL TABLE

(71) Applicant: Beneficial Photonics, Inc., Fremont, CA (US)

(72) Inventors: George Benedict, Fremont, CA (US); Surinder Badyal, Ridgecrest, CA (US); Frank Iorio, Poway, CA (US); Peter Thuesen, Hayward, CA (US)

(73) Assignee: Beneficial Photonics, Inc., Fremont, CA (US)

( * ) Notice: Subject to any disclaimer, the term of this patent is extended or adjusted under 35 U.S.C. 154(b) by 154 days.

(21) Appl. No.: 15/140,422

(22) Filed: Apr. 27, 2016

(65) Prior Publication Data

US 2017/0314905 A1    Nov. 2, 2017

(51) Int. Cl.
*G01B 5/008*  (2006.01)
*B23Q 17/22*  (2006.01)
*G05B 19/4155*  (2006.01)

(52) U.S. Cl.
CPC ............ *G01B 5/008* (2013.01); *B23Q 17/22* (2013.01); *G05B 19/4155* (2013.01); *G05B 2219/33099* (2013.01)

(58) Field of Classification Search
CPC ..... G01B 5/008; B23Q 17/22; G05B 19/4155
USPC ........................................................... 33/503
See application file for complete search history.

(56) References Cited

U.S. PATENT DOCUMENTS

| | | | | |
|---|---|---|---|---|
| 5,193,286 A | * | 3/1993 | Collier | G01B 5/0002 33/1 M |
| 5,285,397 A | * | 2/1994 | Heier | G01B 11/002 33/503 |
| 5,895,444 A | * | 4/1999 | Ruck | G05B 19/401 33/503 |
| 6,019,554 A | | 2/2000 | Hong | |
| 7,712,224 B2 | * | 5/2010 | Hicks | G01B 21/045 33/502 |
| 9,235,206 B2 | | 1/2016 | Benedict et al. | |
| 2001/0008047 A1 | * | 7/2001 | Okada | G01B 5/008 33/503 |

(Continued)

OTHER PUBLICATIONS

International Search Report and Written Opinion issued to international patent application No. PCT/US17/29717, dated Aug. 7, 2017, 7 pgs.

*Primary Examiner* — G. Bradley Bennett
(74) *Attorney, Agent, or Firm* — Cooley LLP

(57) ABSTRACT

An apparatus to assist a machinist in the setup of a remote computer controlled machine tool table has an X-axis electronic gauge block assembly, a Y-axis electronic gauge block assembly, and a Z-axis electronic gauge block assembly each positioned on the machine tool table, to respectively collect X-axis probe position values, Y-axis probe position values, and Z-axis probe position values. Environmental sensors collect environmental values. An electronics processing system establishes a raw X-axis probe position, a raw Y-axis probe position, and a raw Z-axis probe position. A wireless interface transmits the environmental values, the raw X-axis probe position value, the raw Y-axis probe position value, and the raw Z-axis probe position value to the remote computer and receives from the remote computer refined probe position values to assist the machinist in the setup of the machine tool table.

17 Claims, 12 Drawing Sheets

(56) References Cited

U.S. PATENT DOCUMENTS

| | | | |
|---|---|---|---|
| 2007/0220767 A1* | 9/2007 | Pettersson | G01B 5/008 |
| | | | 33/503 |
| 2010/0139107 A1* | 6/2010 | Koinuma | G01B 5/20 |
| | | | 33/503 |
| 2011/0054835 A1* | 3/2011 | Takamasu | G01B 5/008 |
| | | | 702/150 |
| 2014/0007441 A1* | 1/2014 | Pettersson | G01B 5/008 |
| | | | 33/503 |
| 2014/0157610 A1* | 6/2014 | Garvey | G01B 21/04 |
| | | | 33/503 |
| 2015/0000148 A1* | 1/2015 | Abe | G01B 5/008 |
| | | | 33/503 |
| 2015/0091489 A1 | 4/2015 | Benedict et al. | |
| 2016/0041068 A1 | 2/2016 | Wascat et al. | |
| 2016/0054722 A1 | 2/2016 | Jalluri et al. | |
| 2016/0216098 A1* | 7/2016 | Hediger | B23Q 7/10 |
| 2017/0227343 A1* | 8/2017 | Singh | G01B 5/008 |
| 2017/0241759 A1* | 8/2017 | Werner | G01B 5/004 |

* cited by examiner

```
%
O00002 (STEP AND CONDITIONAL BRANCH TEST)
G103 P1 (Look ahead 1 step - necessary for dwell)
G04 P1.0 (Dwell 1 second)
G00 Z-10.0000 (move to Z=-10.0000 check X and Y are OK first)
G04 P1.0 (Dwell 1 second)
 M96 P4 Q15
DPRNT[**Step*1**Z*=*#5023[4,4]***Flag*IS*HI***]
G00 Z-10.0010 (move to Z=-10.0010)
G04 P1.0 (Dwell 1 second)
 M96 P4 Q15
DPRNT[**Step*2**Z*=*#5023[4,4]***Flag*IS*HI***]
G00 Z-10.0020 (move to Z=-10.0020)
G04 P1.0 (Dwell 1 second)
 M96 P4 Q15
DPRNT[**Step*3**Z*=*#5023[4,4]***Flag*IS*HI***]
G00 Z-10.0030 (move to Z=-10.0030)
G04 P1.0 (Dwell 1 second)
 M96 P4 Q15
DPRNT[**Step*4**Z*=*#5023[4,4]***Flag*IS*HI***]
G00 Z-10.0040 (move to Z=-10.0040)
G04 P1.0 (Dwell 1 second)
 M96 P4 Q15
DPRNT[**Step*5**Z*=*#5023[4,4]***Flag*IS*HI***]
G00 Z-10.0050 (move to Z=-10.0050)
G04 P1.0 (Dwell 1 second)
 M96 P4 Q15
DPRNT[**Step*6**Z*=*#5023[4,4]***Flag*IS*HI***]
G00 Z-10.0060 (move to Z=-10.0060)
G04 P1.0 (Dwell 1 second)
 M96 P4 Q15
DPRNT[**Step*7**Z*=*#5023[4,4]***Flag*IS*HI***]
G00 Z-10.0070 (move to Z=-10.0070)
G04 P1.0 (Dwell 1 second)
 M96 P4 Q15
DPRNT[**Step*8**Z*=*#5023[4,4]***Flag*IS*HI***]
G00 Z-10.0080 (move to Z=-10.0080)
G04 P1.0 (Dwell 1 second)
 M96 P4 Q15
DPRNT[**Step*9**Z*=*#5023[4,4]***Flag*IS*HI***]
G00 Z-10.0090 (move to Z=-10.0090)
G04 P1.0 (Dwell 1 second)
 M96 P4 Q15
DPRNT[**Step*10**Z*=*#5023[4,4]***Flag*IS*HI***]
N3 GOTO5
N4
DPRNT[**Last*Step**Z*=*#5023[4,4]***Flag*IS*LOW***]
N5 M30  (END OF FILE)
(END OF PROGRAM)

%                                                             Figure 7A
``` the placing step is performed accurately and correctly. Since these exact coordinates may differ from the typical digital readout values, a new display located on the machine tool table would make it much easier for the machinist to have access to this information during setup of the machine tool table. Measurement probes, such as edge finder tools, may be used to determine the exact coordinate positions of vices, indexed stops, parallels and features on the work piece. The performance of these tools is also improved by using the new display of refined positions.

APPARATUS FOR THE COMPUTER ASSISTED SETUP OF A MACHINE TOOL TABLE

TECHNICAL FIELD

The present invention relates generally to machine tool tables. More particularly, the invention relates to the computer assisted setup of a machine tool table.

BACKGROUND

Software for CAD (computer assisted design) is typically used to design a part, and software for CAM (computer assisted manufacturing) is typically used to make the part. It would be desirable to develop CAS (computer assisted setup) that works together with the CAM process to allow more efficient and more accurate operation of part manufacturing. Ideally, CAS would assist the machinist during setup of the machine tool table and also during the fabrication process.

A CAD process creates an engineering drawing comprising a 3D digital representation of a part. For a square prism type part, the 3D digital representation may contain six views represented by orthographic projections that describe features to be machined into each of the six faces. The CAM process provides all the details necessary for the CNC (computer numeric control) mill to machine this part starting from a solid blank material, called the work piece. The CAM process also gives instructions whereby the machinist may have to place and replace this work piece six or more times. Drawing origin coordinates Xdi, Ydi, and Zdi may be defined; in the case of a square prism i may range from 1 to 6, for each of the six faces of the work piece that is held in a vise comprising a fixed jaw and a clamping jaw.

Each placing step may require a new origin located in Xdi, Ydi, and Zdi coordinates referenced to a reference point on the fixed vise jaw. And each placing step will require an indexed stop to determine the Xdi coordinate, parallels to determine the Zdi coordinate, and manipulation of the work piece. That is, the work piece is clamped using the vice clamping jaw. This involves pushing the work piece up against the fixed vise jaw to determine the Ydi coordinate and pushing the work piece up against the indexed stop to determine the Xdi coordinate. Typically the machinist assumes that the work piece remains upon and against the parallels during the clamping process to determine the Zdi coordinate.

The failure of the work piece to be properly positioned during the clamping process is referred to as a seating failure. Seating failure may also result from debris, created during the work piece cutting operations, adhering to a reference surface located on the fixed vise jaw, the indexed stop or the parallels. It would be desirable to have a CAS process to assist the machinist during work piece manipulation to identify seating failure. The prompt identification of seating failure allows the machinist to remedy the problem before continued cutting operations may ruin the work piece.

It is desirable to have a CAS process for each placing step, where the machinist may have to setup a stop or place parallels, for the computer to assist the machinist by providing instructions as to the exact coordinates so as to insure the placing step is performed accurately and correctly. Since these exact coordinates may differ from the typical digital readout values, a new display located on the machine tool table would make it much easier for the machinist to have access to this information during setup of the machine tool table. Measurement probes, such as edge finder tools, may be used to determine the exact coordinate positions of vices, indexed stops, parallels and features on the work piece. The performance of these tools is also improved by using the new display of refined positions.

Typically, a machinist uses a flexible touch probe with a dial indicator to measure small deviations between a gauge block and features on the machined part with an accuracy of ±0.0001 inches. This inspection process, sometimes using a machine referred to as a CMM (coordinate measurement machine), is performed after the part has been made, and is typically carried out in a clean room environment.

It is desirable to have a CAS process with this capability on the machine tool table so that the ±0.0001 inch accuracy can be referred to both before and during part fabrication. As a flexible touch probe with a dial indicator would be gummed up by the CNC machine cutting and coolant fluids, a new approach is needed that establishes a coordinate system of accurate points. U.S. Pat. No. 9,235,206 discloses a rigid probe to determine a single accurate position called an origin. It would be desirable to extend this approach to determine a coordinate system of accurate points.

With a rigid probe in the tool holder and the exact coordinates to insure each step is performed accurately and correctly, it would be beneficial to have a CAS process that uses the probe to assist the machinist in the setup of indexed stops. It is also desirable to have an indexed stop with probe engagement features.

BRIEF DESCRIPTION OF THE DRAWINGS

FIG. 7A shows a CNC program.

SUMMARY

An apparatus to assist a machinist in the setup of a remote computer controlled machine tool table has an X-axis electronic gauge block assembly, a Y-axis electronic gauge block assembly, and a Z-axis electronic gauge block assembly each positioned on the machine tool table, to respectively collect X-axis probe position values, Y-axis probe position values, and Z-axis probe position values. Environmental sensors collect environmental values. An electronics processing system establishes a raw X-axis probe position, a raw Y-axis probe position, and a raw Z-axis probe position. A wireless interface transmits the environmental values, the raw X-axis probe position value, the raw Y-axis probe position value, and the raw Z-axis probe position value to the remote computer and receives from the remote computer refined probe position values to assist the machinist in the setup of the machine tool table.

DETAILED DESCRIPTION

An apparatus is described herein, which uses X-axis, Y-axis, and Z-axis electronic gauge block assemblies for the computer assisted setup of a machine tool table including the determination of a refined position coordinate system. These refined positions improve the raw digital readout values by taking into account how environmental factors such as temperature, relative humidity, and plumb bob indications affect the machine tool table. The apparatus may display these refined positions with a display located on the machine tool table and assist the machinist in setting up a vise and stops on the machine tool table and also in the manipulation of the work piece during manufacture.

Figure 1A:
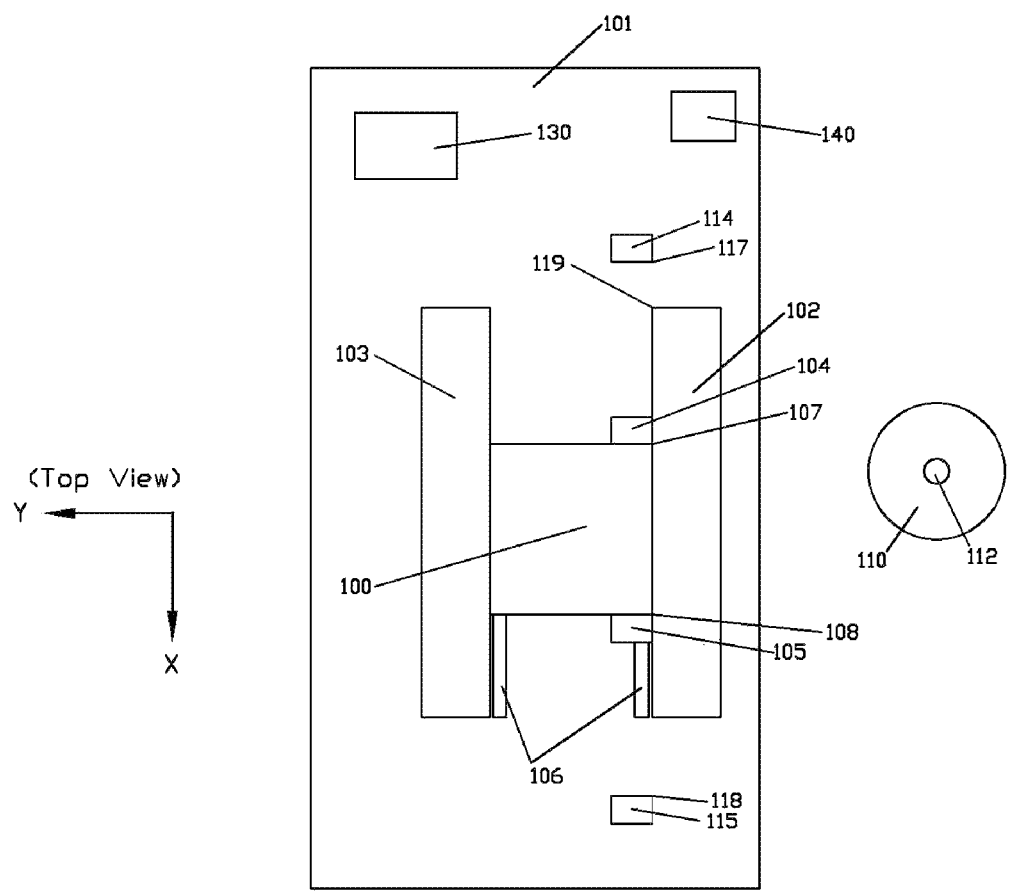
FIG. 1A is a top view of a milling machine.

FIG. 1A is a top view of the relevant elements of a typical three-axis vertical CNC milling machine, with a tool holder 110, which is used to hold rotary cutter 112. The tool holder 110 is used to change tools and store tools in the CNC milling machine. The table 101 moves in the X and Y axis directions and the tool holder 110 moves in the Z axis direction.

A tool pre-setter 140 is shown on the table 101. It serves to measure each rotary cutter 112 to determine the cutting diameter and the Z axis offset from the bottom of rotary cutter 112 to the tool holder 110 Z axis reference surface.

Indexed stops 104 and 114 for left handed origins and indexed stops 105 and 115 for right handed origins are shown, where typically only one need be used at a time to define the X axis location of a particular origin for work piece 100. Indexed stops 104, 114, 105, and 115 are indexed to the fixed vise jaw 102 so that it is convenient to remove and replace such indexed stops in their original position and orientation during the fabrication process. Indexed stops 104 and 105 are internal to the vise and are attached to the fixed vise jaw 102. Indexed stops 114 and 115 are external to the vise and are mounted on the table 101.

Figure 2A:
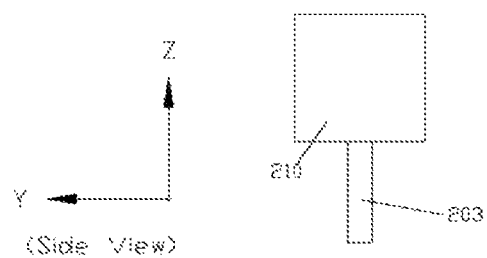
FIG. 2A is a side view of a probe.

In one embodiment indexed stop 114 is a probe engaging indexed stop. The description of a probe engaging indexed stop 114 is described below in connection with FIG. 12A and FIG. 12B. The probe 203 as described below in connection with FIG. 2A, is used to engage the probe engaging indexed stop 114 to set it up as described below in connection with FIG. 13A and FIG. 13B. The probe engaging indexed stop 114 is mounted on the table and may serve as either a right handed or left handed stop. In addition, probe engaging stop 114 may serve as an external or internal stop relative to the vise. As discussed below, when used as an internal stop, the probe engagement may be set up with a probe 203 that is external to the vise that may feature a miniature bar for small and hard to reach work pieces 100.

Fixed vise jaw 102 has a reference point 119 with coordinates Xv, Yv, and Zv, where Xv and Yv are defined by reference surfaces on fixed vise jaw 102, and Zv is defined by the top surface of table 101 in the vicinity of the reference point 119. Parallels 106 are also shown inside the vise and are used to define a fixed offset from the Zv position of the bottom of the work piece 100.

Hence the X and Y coordinates of origins 107, 117, 108, and 118 are determined with respect to reference point 119 on the fixed vise jaw 102. The Z coordinates of all origins 107, 117, 108, and 118, are determined with respect to the table top 101 in the vicinity of each stop.

Also shown in FIG. 1A is plumb bob sensor 130, typically required to level the table 101 during installation. The plumb bob sensor 130 is usually removed during CNC milling machine operation and is not referenced during setup.

Figure 1B:
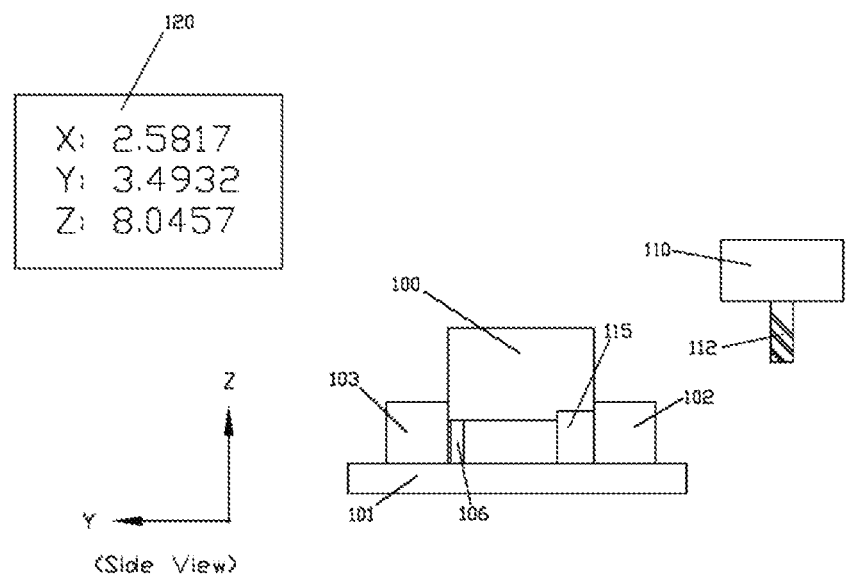
FIG. 1B is a side view of a milling machine.

FIG. 1B is a side view of table 101 and tool holder 110 and rotary cutter 112 of the CNC milling machine. A digital readout 120 on the CNC milling machine displays the coordinates in each of the X, Y, and Z axes. The invention provides improved digital readout 120 values, which are called herein refined positions. The refined positions define a coordinate system with a reference point with values Xr and Yr and Zr, where this process is described below in connection with FIGS. 10 and 11. When the vise reference point 119 with values Xv and Yv and Zv, and the X and Y coordinates of origin 117 are determined using refined positions, it is possible to achieve ±0.0001 inch accuracy in the setup of the vise and the probe engaging indexed stop 114.

FIG. 2A is a side view of probe 203 mounted in the tool holder 210. To achieve high accuracy, tool holder 210 is a shrink fit tool holder such as made by Techniks, Inc. in Indianapolis, Ind. with part number 29021 referred to as CAT40×⅜" ID with a TIR (total indicated runout) of 0.0001 inch.

Figure 2B:
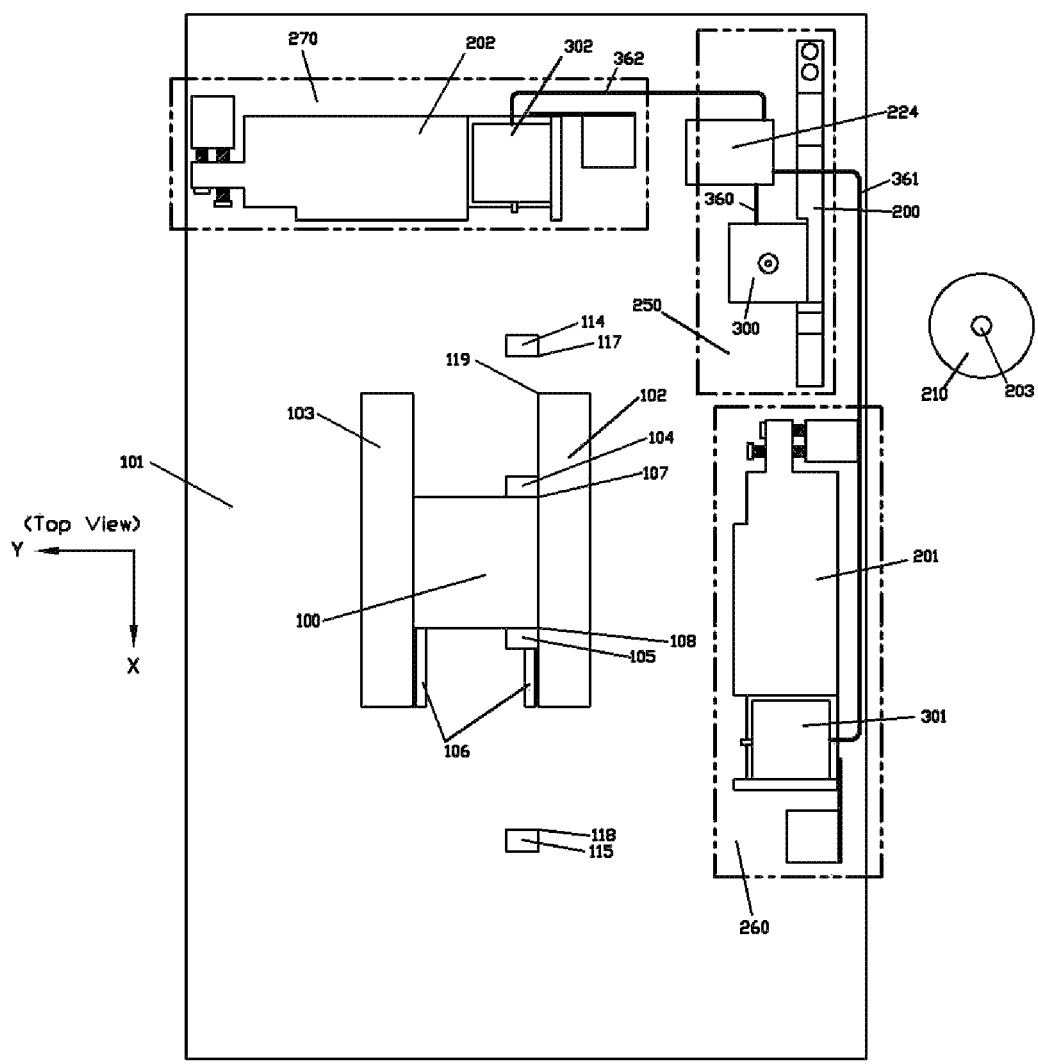
FIG. 2B is a top view of X, Y, and Z axis electronic gauge block assemblies installed on a milling machine table.

FIG. 2B is a top view of the table 101 showing the vice with fixed jaw 102, fixed vise jaw reference point 119, clamping jaw 103, parallels 106, and indexed stops 104, 114, 105 and 115. The plumb bob sensor 130 and tool setter 140 are not shown, but may be present. When tool setter 140 is present, it is typically enclosed so as to avoid contamination during part manufacture.

During setup, fixed jaw 102 is positioned on the table 101, such that the orientation of the edge containing fixed vise jaw reference point 119 is in the X axis direction. The machinist typically uses a flexible probe with a dial indicator to insure that the runout in the Y axis direction of the Y axis point is less than ±0.0001 inches as measured between fixed vise jaw reference point 119 and the point on fixed jaw 102 farthest from point 119. This orientation of the edge containing fixed vise jaw reference point 119 is in the X axis direction and now defines the X axis and this Y axis point defines Yv.

The electronic gauge block Y assembly 260 includes electronic gauge block 301, bar 201, and electronic cable 361. The setup of the bar 201 is similar to the setup of the fixed vise jaw 102. During setup the bar 201 is first positioned in the X axis direction with a flexible probe with a dial indicator to insure the Y axis runout is less than ±0.0001 inch, similar to the process for vise fixed jaw 102. Electronic gauge block 301 provides a signal over electronic cable 361 to electronics interface box 224 to determine a raw Y reference position, Yr.

Electronic gauge block X assembly 270 includes electronic gauge block 302, bar 202, and electronic cable 362. The bar 202 is aligned in the Y axis direction, with a flexible probe with a dial indicator to insure the X axis runout is less than ±0.0001 inch. More details for the setup of the bar 202 are provided below in connection with the description of FIG. 9. The bar 202 holds the electronic gauge block 302 and electronic cable 362. Electronic gauge block 302 provides a signal over electronic cable 362 to electronics interface box 224 to determine a raw X reference position Xr.

Electronic gauge block Z assembly 250 includes electronic gauge block 300, bar 200, and electronic cable 360. The bar 200 is aligned in the Z axis direction. More details for the setup of bar 200 are provided below in connection with the description of FIG. 8. Electronic gauge block 300 provides a signal over electronic cable 360 to electronics interface box 224 to determine a raw Z reference position Zr.

The three electronic gauge blocks assemblies 250, 260, and 270, along with electronics interface box 224, enable the computer assisted setup, or CAS, operation of the CNC milling machine to determine the refined positions to within ±0.0001 inch accuracy, and hence the required origin positions for each placing step in the CAM process for part manufacture. For example, knowing the reference position Xr, Yr, and Zr, allows the required origin positions 107, 117, 108, or 118 to be determined by a refined position fixed offset first to the vise jaw reference point 119, at coordinates Xv, Yv, Zv, and then by a refined position fixed offset to either required origin position 107, 117, 108, or 118.

Figure 3A:
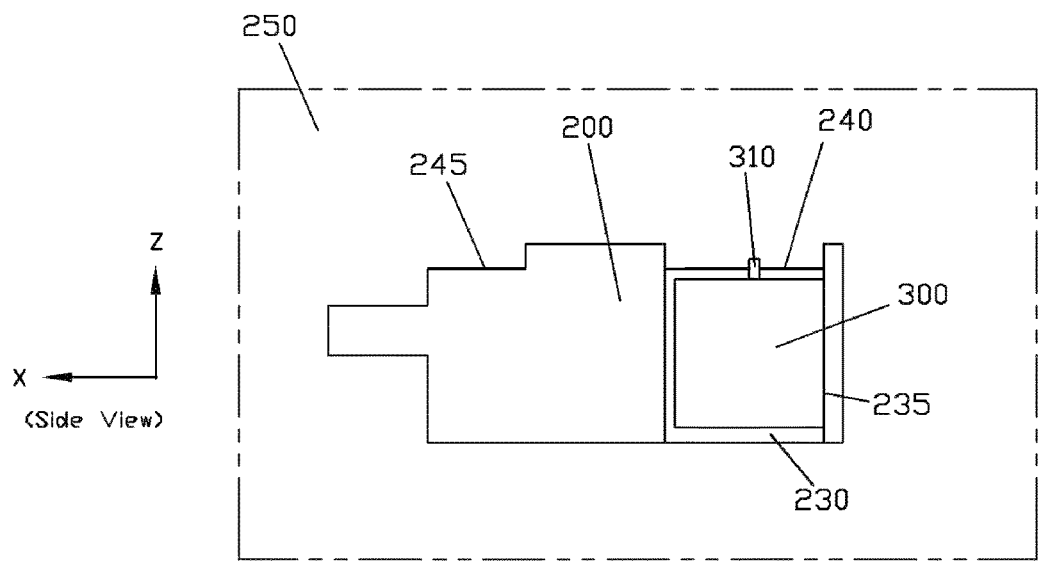
FIG. 3A is a side view of a Z axis electronic gauge block mounted on a bar.
Figure 3B:
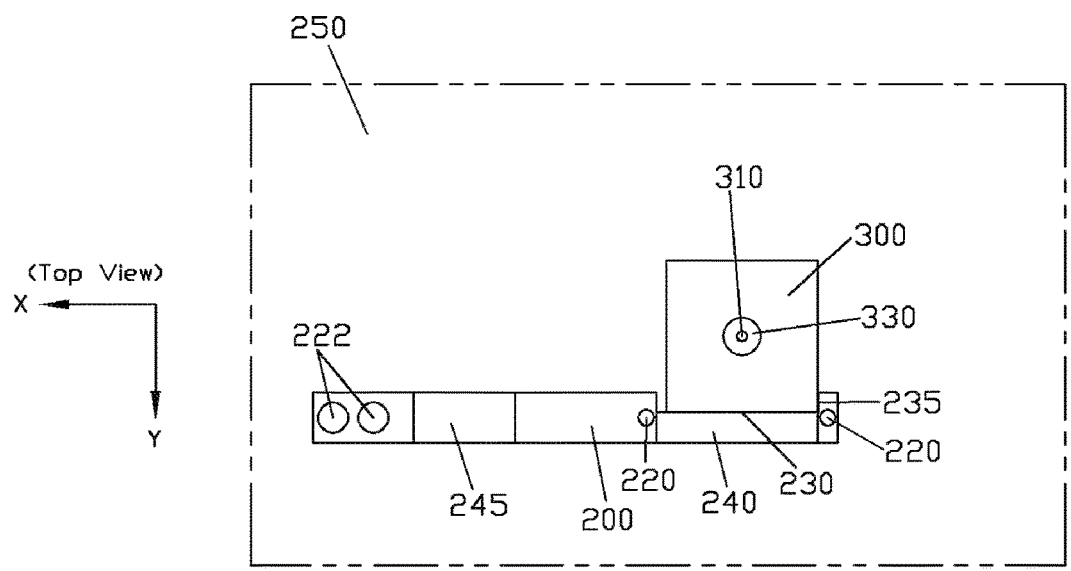
FIG. 3B is a top view of a Z axis electronic gauge block mounted on a bar.

FIG. 3A shows a side view and FIG. 3B shows a top view of the Z axis electronic gauge block assembly 250 with electronic gauge block 300 mounted on bar 200. Reference surface 235 establishes the X axis position, and reference surface 230 establishes the Y axis position of electronic gauge block 300 on the bar 200. Reference surfaces 245 and 240 are convenient surfaces for flexible touch probe indicator points on bar 200 to insure bar 200 has zero runout error in the Z axis direction, and hence the electronic gauge block tip 310 is pointing in the Z axis direction. Reference surface 240 also defines the position of Zr for placing gauge blocks as described below in connection with FIG. 10 to establish the Z axis of the refined position coordinate system.

FIG. 3B also shows holes 222 on bar 200 used for push-pull alignment screws described below in connection with FIG. 8. Holes 220 on bar 200 allow calibration plate 800 to be secured to bar 200 as described below in connection with FIG. 8. The flexible seal 330 prevents contamination from entering the block 300. The flexible seal 330 adheres to tip 310 and block 300, and also allows tip 310 to move freely in the Z axis direction.

Figure 4A:
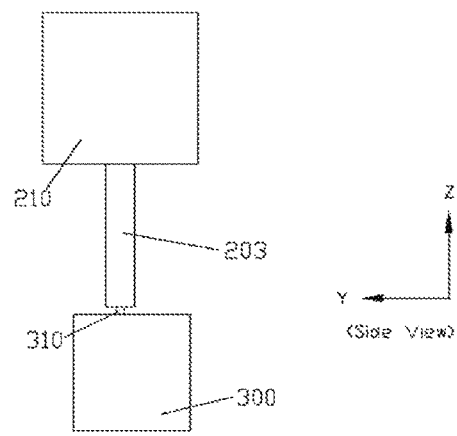
FIG. 4A is a side view of Z axis moveable probe engagement components.

The tip 310 can move about plus or minus 0.0500 inches in the Z axis direction above and below the reference position Zr defined by reference surface 240. The moveable probe engagement components of electronic gauge block 300 are shown in FIG. 4A where the tip 310 engages the probe 203. FIG. 4A shows a side view of the moveable probe engagement components where the bottom side of probe 203 engages the tip 310 at the reference position Zr.

Figure 4B:
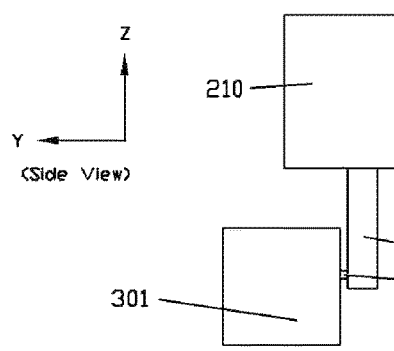
FIG. 4B is a side view of Y axis moveable probe engagement components.
Figure 4C:
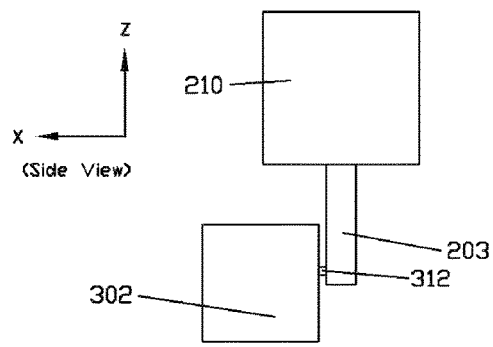
FIG. 4C is a side view of X axis moveable probe engagement components.

The moveable probe engagement components of electronic gauge block 301 are shown in FIG. 4B where the tip 311 engages the cylinder side of probe 203 at the reference position Yr. The moveable probe engagement components of electronic gauge block 302 are shown in FIG. 4C where the tip 312 engages the cylinder side of probe 203 at the reference position Xr.

Figure 5A:
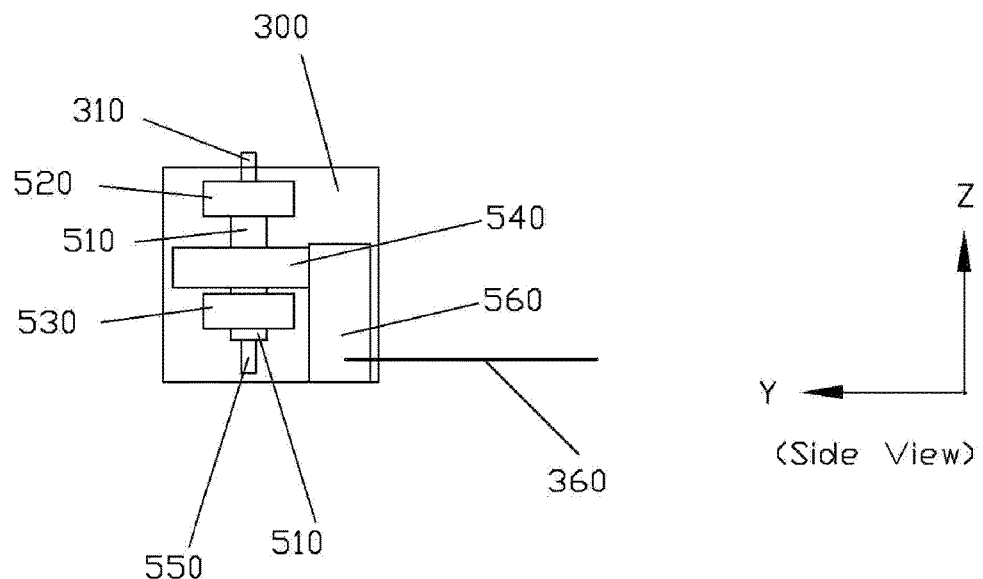
FIG. 5A is a side view of the inside of an electronic gauge block.

FIG. 5A shows a side view of the inside of the electronic gauge block 300. The tip 310 is connected to the first end of a shaft 510 and a spring 550 is connected to the second end of shaft 510. The shaft 510 motion is constrained by bearings 520 and 530. A shutter 540 is connected to the shaft and is used by optical sensor 560. Bearings 520, 530, spring 550, and optical sensor 560 are held in place by block 300. Also shown in FIG. 5A is an electrical cable 360 entering block 300 and connecting to optical sensor 560.

Figure 5B:
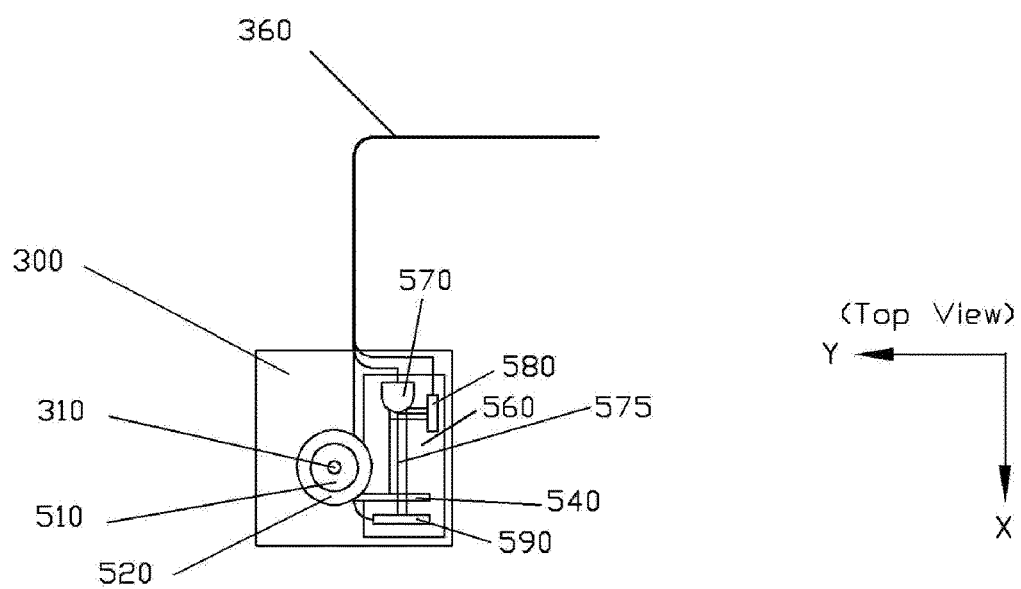
FIG. 5B is a top view of the inside of an electronic gauge block.

FIG. 5B shows a top view of the inside of electronic gauge block 300. Electrical cable 360 connects to optical sensor 560 by splitting into four wires connecting the LED 570, the reference photo detector 580, the signal photo detector 590, and a ground wire (not shown). The light rays 575 strike the reference photo detector 590, and the shutter 540 blocks a portion of light rays 575 reaching the signal photo detector 590.

Electronic gauge blocks 301 and 302 have configurations corresponding to those described in connection with electronic gauge block 300.

Figure 6:
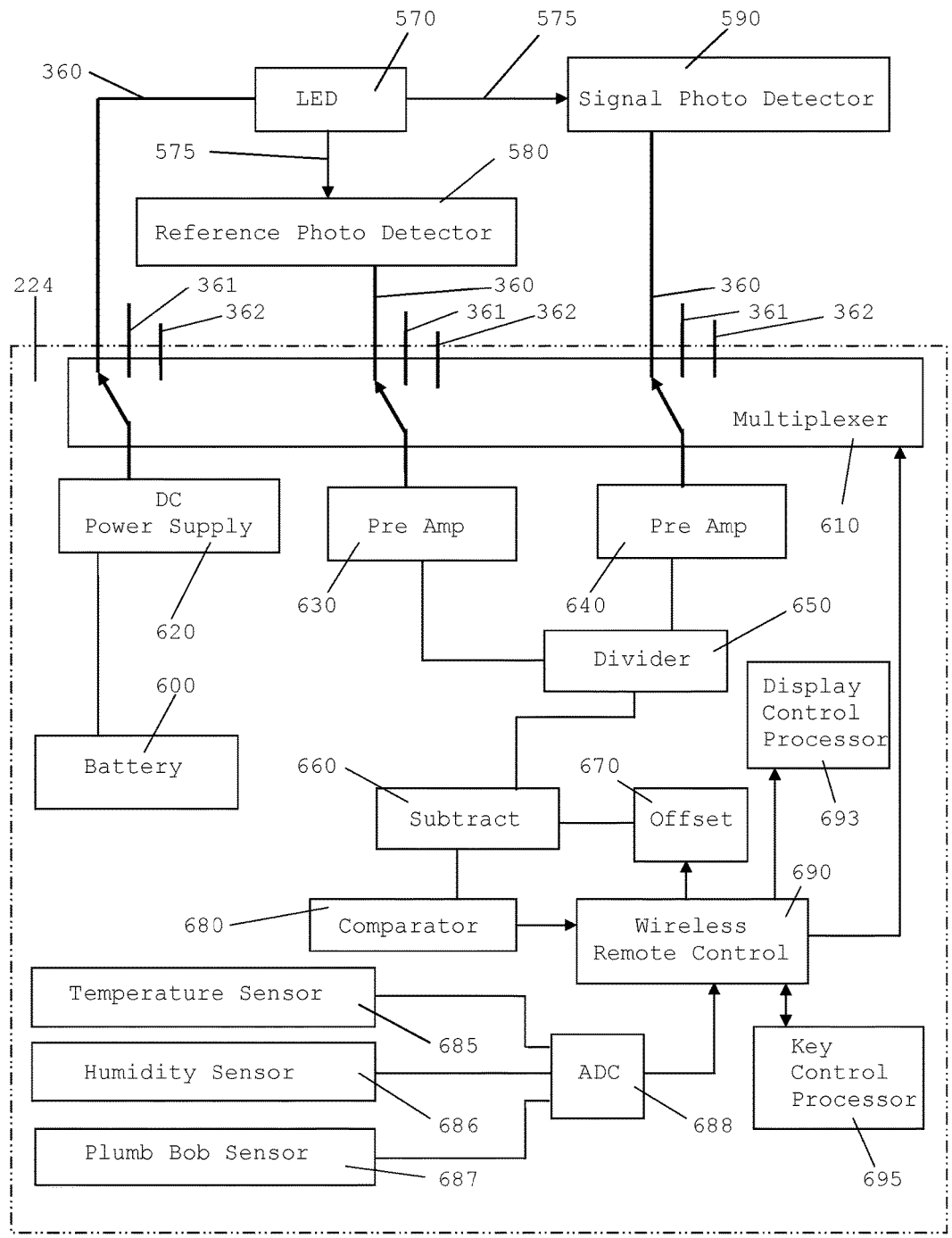
FIG. 6 shows electrical circuit elements of an electronic gauge block.

The components inside of electrical interface box 224 are shown in FIG. 6. A rechargeable battery 600 powers the DC power supply 620, as well as the electronics in the interface box 224. A multiplexer 610 accepts the three cables 360, 361, and 362, and as shown in this case selects cable 360. The DC power supply 620 powers the LED 570. The pre amp 630 converts the reference photo detector 580 current into voltage, and the pre amp 640 converts the signal photo detector 590 current into voltage. The ground is not shown. The divider 650 takes the ratio of the signal voltage to the reference voltage to normalize the signal voltage. The subtract element 660 removes a Z axis offset 670 voltage from the normalized signal voltage. Finally the comparator 680 goes low when the normalized signal voltage from the subtract element 660 crosses zero and becomes negative, thereby determining the reference position for Zr.

Wireless remote control 690 receives a signal from a remote computer 700 shown in FIG. 7, and sets the multiplexer 610 to select cable 360, and sets the Z axis offset voltage on offset 670. The state of comparator 680 is sent back to the remote computer 700 using the wireless remote control 690. A key control processor 695 accepts a key control code via the wireless remote control 690 from the remote computer 700. If the received key control code matches a stored key control code, access to the system is enabled.

Wireless remote control 690 receives refined position values from the remote computer 700 wireless remote control 701. A display control processor 693 in electrical interface box 224, may control the display of refined positions on displays external to electrical interface box 224 as described below in connection with the description of FIGS. 10 and 11.

Environmental sensors, such as temperature sensor 685, humidity sensor 686, and plumb bob sensor 687 collect analog voltages that are converted to digital signals by ADC 688 and are sent to the remote computer 700 using the wireless remote control 690.

When wireless remote control 690 selects cable 361 and provides a Y axis offset 670 voltage, the state of comparator 680 is monitored for a transition to a low state, thereby determining the reference position for Yr. This information is sent to the remote computer 700.

When wireless remote control 690 selects cable 362 and provides an X axis offset 670 voltage, the state of comparator 680 is monitored for a transition to a low state, thereby determining the reference position for Xr. This information is sent to the remote computer 700.

Figure 7B:
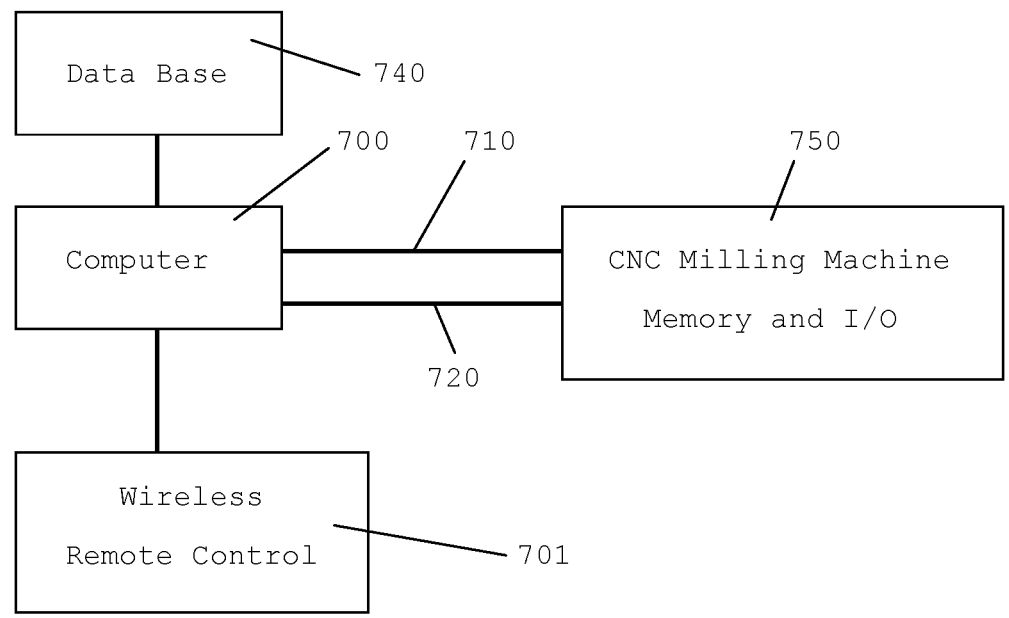
FIG. 7B shows milling machine control electronics.

FIG. 7A gives an example of a CNC program for a CNC milling machine (e.g., a Haas Mill 96-8000). FIG. 7B illustrates a computer 700 operating in conjunction with a CNC milling machine 750. In one embodiment, the remote computer 700 loads the CNC program into the memory of the CNC milling machine 750 over RS-232 cable 710. When the CNC milling machine is run with this example program, the Z axis position of tool holder 210 with probe 203 is moved down step by step until the Z axis electronic gauge block tip 310 reaches the reference Z position Zr. The state of comparator 680 is monitored for a transition to a low state by remote computer 700. The remote computer 700 provides this digital I/O control signal to the CNC milling machine by using cable 720, where the specific digital I/O terminal is labeled Q15 in the program.

The name of the numeric program is STEP AND CONDITIONAL BRANCH TEST. The start and end of the program are indicated with "%" signs. The program uses the following G and M codes: G103 P1 instructs the numeric mill program to look ahead one line at a time.

G04 P1.0 instructs the numeric mill program to dwell for 1.0 second at this line of code for the milling machine to settle, typically after a move step.

G00 Z-10.0000 instructs the numeric mill program to move the Z axis tool holder to move to position Z=-10.0000, where in this example the tool holder 210 holds the probe 203.

M96 P4 Q15 instructs the numeric mill program to check the digital I/O terminal labeled Q15 and proceed to the next line of code if the state is high and proceed to line N4 if the state is low.

DPRNT instructs the numeric mill program to send the message "Step 1 Z=-10.0000 (the current position of the Z axis in CNC mill memory location #5023) Flag IS HI" back over the RS-232 cable 710 to remote computer 700.

The remote computer 700 also has a wireless remote control 701 that provides communication with wireless remote control 690. Remote computer 700 has a relational database 740 of data from environmental sensors, such as temperature sensor 685, humidity sensor 686, and plumb bob sensor 687. The remote computer 700 uses relational database 740 to make corrections to X, Y, and Z raw positions. The corrections result in refined positions of the coordinate system. The refined positions allow more accurate control of the milling machine. Access to the relational database may be controlled with a password or key, such as the key associated with access to the wireless remote control 690.

The remote computer 700 uses the formula in Equation 1 below to compute the refined positions Z from the raw Z axis values γ. The remote computer 700 searches relational database 740 to obtain the proper Az and Bz and Cz coefficients used in Equation 1 below as related to the present readings of environmental sensors 685 and 686 and 687.

The remote computer 700 uses the formula in Equation 5 below to compute the refined positions X from the raw X axis values α. The remote computer 700 searches relational database 740 to obtain the proper Ax and Bx and Cx coefficients used in Equation 5 below as related to the present readings of environmental sensors 685 and 686 and 687. In a similar manner, remote computer 700 computes the refined Y axis values from raw Y axis values.

Remote computer 700 uses temperature sensor 685 to monitor temperature at regular intervals, of for example 1 minute, and notify the operator if the temperature changes more than a preset limit, of for example ±1° F., thereby indicating that the milling machine is not in thermal equilibrium.

Remote computer 700 uses plumb bob sensor 687 to monitor table tilt at regular intervals, of for example 1 hour, and notify the operator if the table tilts more than a preset limit, of for example ±0.5 degrees, thereby indicating an error condition that the milling machine has been physically disturbed.

Figure 8:
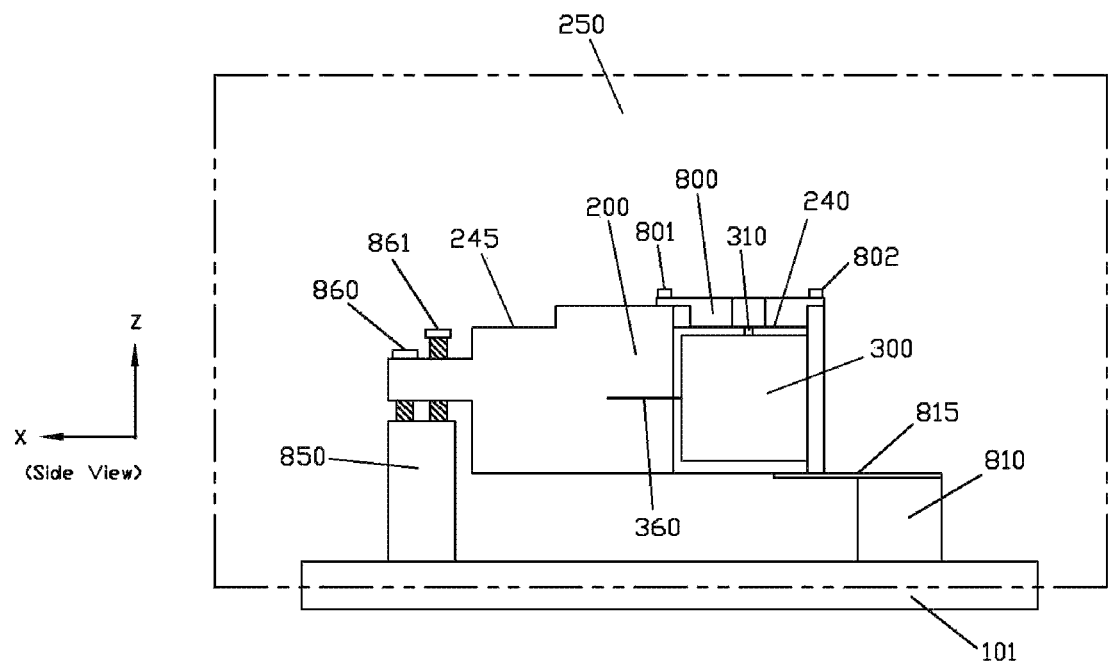
FIG. 8 is a side view of an electronic gauge block Z reference position calibration apparatus.

FIG. 8 shows a side view of the Zr axis calibration procedure for electronic gauge block Z assembly 250. Dual base element 810 secures the bar 200 to the top of table 101 using a flexure 815. The dual base element 850 has push-pull screws 860 and 861 that both position and lock bar 200 so that reference surfaces 245 and 240 have less than ±0.0001 inch runout in the Z axis direction as measured by a flexible touch probe with a dial indicator as described previously in connection with the description of FIGS. 3A and 3B.

When calibration plate 800 is fastened to bar 200 using clamping screws 801 and 802, the tip 310 is depressed to make the position even with the reference surface 240. While the calibration plate 800 is still clamped the computer 700 selects cable 360 and adjusts the Z axis offset 670 so that comparator 680 will transition from a high to low state. Electronic gauge block 300 reference position Zr is now calibrated by the Z axis offset 670 value for Zr stored in computer 700.

Figure 9:
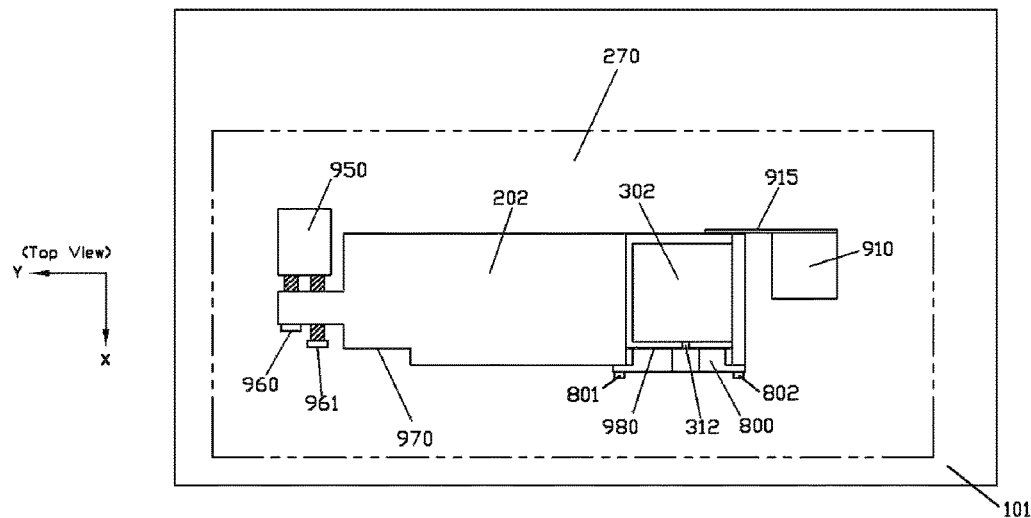
FIG. 9 is a top view of an electronic gauge block X reference position calibration apparatus.

FIG. 9 shows a side view of the Xr axis calibration procedure for electronic gauge block X assembly 250. Dual base element 910 secures the bar 201 to the top of table 101 using a flexure 915. The other dual base element 950 has push-pull screws 960 and 961 that both position and lock bar 201 so that reference surfaces 970 and 980 have less than ±0.0001 inch runout as measured by a flexible touch probe with a dial indicator.

When calibration plate 800 is fastened to bar 201 using clamping screws 801 and 802, the tip 312 is depressed to make the position even with the reference surface 980. While the calibration plate 800 is still clamped the computer 700 selects cable 362 and adjusts the X axis offset 670 so that comparator 680 will transition from a high to low state. Electronic gauge block 302 reference position Xr is now calibrated by the X axis offset 670 value for Xr stored in computer 700. Similarly, the electronic gauge block 301 reference position Yr is also calibrated by the Y axis offset 670 value for Yr stored in computer 700.

Figure 10:
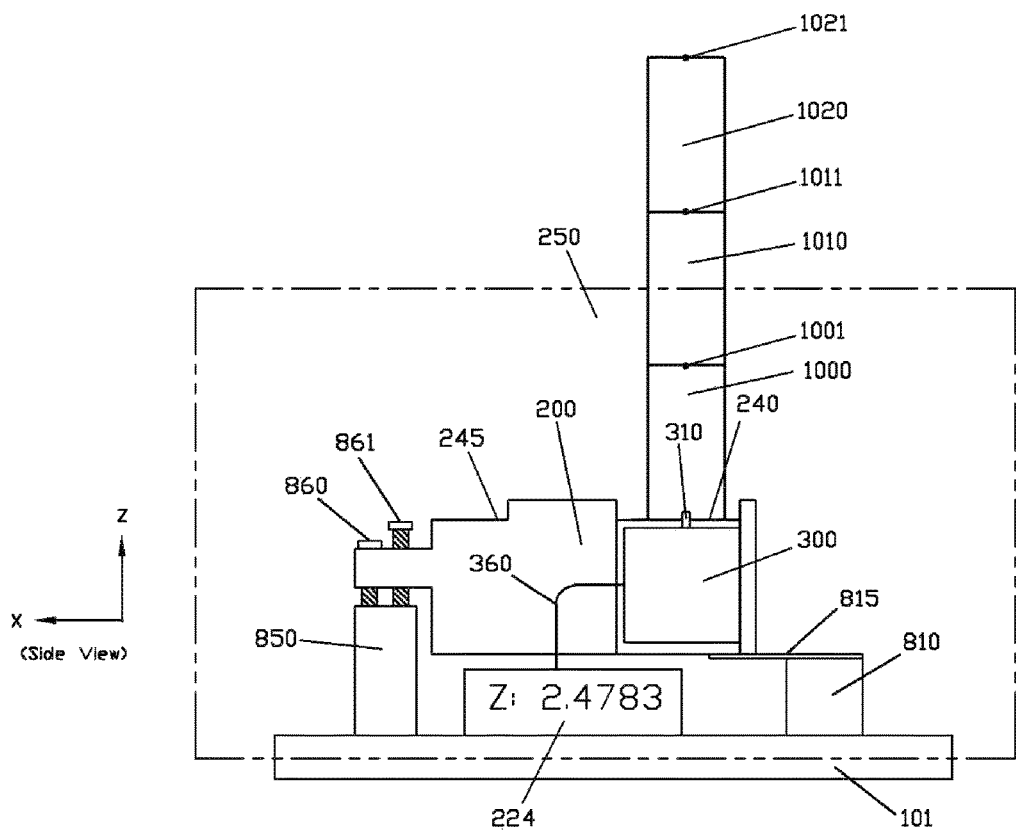
FIG. 10 is a side view of a Z axis coordinate system.

FIG. 10 shows elements for setting up a Z axis coordinate system using electronic gauge block Z assembly 250. Electrical interface box 224 receives refined position values from remote computer 700 and may display these refined Z axis positions on a display located on interface box 224 as shown in the FIG. 10. Gauge block 1000 is placed on reference surface 240. A flexible touch probe touches surface 240 and the digital readout 120 Z value is recorded. This corresponds to the reference position Zr. The point 1001 on the top of gauge block 1000 is now touched with the flexible touch probe and the value of the digital readout 120 Z value is recorded. This Z value corresponds to the raw $\gamma_1$ axis position.

The values of temperature from temperature sensor 685, humidity from sensor 686, and plumb bob sensor 687 are recorded. The refined Z1 axis position depends on the length of the gauge block 1000 at the temperature sensor 685 value. The data values (Z1, $\gamma_1$) are used in Equation 2 shown below.

This process is continued with gauge block 1010 placed on top of gauge block 1000. The touch probe is used to record the raw value of the digital readout 120 for the point 1011. This position is the raw $\gamma_2$ position. The refined Z2 position is the sum of gauge block 1000 length plus gauge block 1010 length at the temperature sensor 685 value. The data values (Z2, $\gamma_2$) are used in Equation 3 shown below.

Using gauge block 1020 another set of values for the raw digital readout 120 indication Z value of $\gamma_3$ position of point 1021, and the refined position of Z3 defined by the sum of the temperature corrected lengths of gauge blocks 1000, 1010, and 1020. The data values (Z3, $\gamma_3$) are used in Equation 4 shown below.

The value of the refined value of Z for any point $\gamma$ on the interval between Zm and Z3 can be calculated from the relation:

$$Z = A_z\gamma + B_z\gamma^2 + C_z\gamma^3 \qquad \text{Equation 1.}$$

where Z is the refined position, and $\gamma$ is the raw position.

Az, Bz, and Cz are three coefficients determined from the data above by the three equations:

$$Z1 = A_z\gamma_1 + B_z\gamma_1^2 + C_z\gamma_1^3 \qquad \text{Equation 2.}$$

$$Z2 = A_z\gamma_2 + B_z\gamma_2^2 + C_z\gamma_2^3 \qquad \text{Equation 3.}$$

$$Z3 = A_z\gamma_3 + B_z\gamma_3^2 + C_z\gamma_3^3 \qquad \text{Equation 4.}$$

Let $S1 = Z1\gamma_2 - Z2\gamma_1$ $S2 = \gamma_2\gamma_1^3 - \gamma_1\gamma_2^3$ $S3 = \gamma_2\gamma_1^2 - \gamma_1\gamma_2^2$ $S4 = Z1\gamma_3 - Z3\gamma_1$ $S5 = \gamma_3\gamma_1^3 - \gamma_1\gamma_3^3$ and $S6 = \gamma_3\gamma_1^2 - \gamma_1\gamma_3^2$ then $Cz = [S3\ S4 - S6\ S1] \div [S3\ S5 - S2\ S6]$ and $Bz = [S1 - Cz\ S2] \div S3$ and $Az = S1 \div \gamma_1 - Bz\gamma_1 - Cz\gamma_1^2$ This set of Az, Bz, and Cz values for the environmental sensor 685, 686, and 687 readings are stored in the relational database 740. Additional sets of Az, Bz, and Cz values are determined for temperature, humidity, and plumb bob values that span the operational environmental limits of the milling machine and are stored in the relational database 740.

Figure 11:
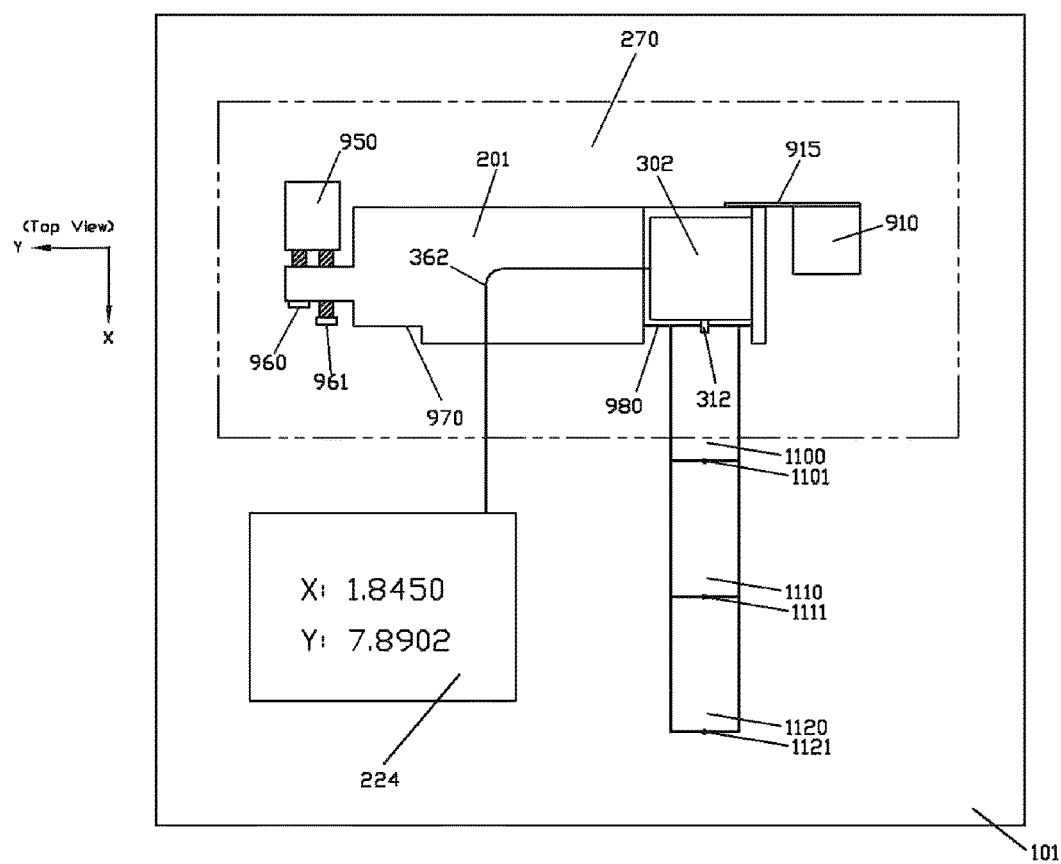
FIG. 11 is a top view of an X axis coordinate system.

FIG. 11 shows elements for setting up an X axis coordinate system using electronic gauge block X assembly 270. Electrical interface box 224 receives refined position values from remote computer 700 and may display these refined X and Y axis positions on a display located on interface box 224 as shown in the FIG. 11. Gauge block 1100 is placed on reference surface 980. A touch probe touches surface 980 and the digital readout 120 X value is recorded. This corresponds to reference position Xr. The point 1101 at the end of gauge block 1100 is now touched with the touch probe and the value of the digital readout 120 X value is recorded. This X value corresponds to the raw $\alpha_1$ axis position, and so on for $\alpha_2$ and $\alpha_3$. The data set (X1, $\alpha_1$) is used in Equation 6. The data set (X2, $\alpha_2$) is used in Equation 7. And the dataset (X3, $\alpha_3$) is used in Equation 8.

The value of the refined value of X for any point $\alpha$ on the interval between Xm and X3 can be calculated from the relation:

$$X = A_x\alpha + B_x\alpha^2 + C_x\alpha^3 \qquad \text{Equation 5.}$$

where X is the refined position, and $\alpha$ is the raw position.

Ax, Bx, and Cx are three coefficients determined from the data above by the three equations:

$$X1 = A_x\alpha_1 + B_x\alpha_1^2 + C_x\alpha_1^3 \qquad \text{Equation 6.}$$

$$X2 = A_x\alpha_2 + B_x\alpha_2^2 + C_x\alpha_2^3 \qquad \text{Equation 7.}$$

$$X3 = A_x\alpha_3 + B_x\alpha_3^2 + C_x\alpha_3^3 \qquad \text{Equation 8.}$$

Let $Q1 = X1\alpha_2 - X2\alpha_1$ $Q2 = \alpha_2\alpha_1^3 - \alpha_1\alpha_2^3$ $Q3 = \alpha_2\alpha_1^2 - \alpha_1\alpha_2^2$ $Q4 = X1\alpha_3 - X3\alpha_1$ $Q5 = \alpha_3\alpha_1^3 - \alpha_1\alpha_3^3$ and $Q6 = \alpha_3\alpha_1^2 - \alpha_1\alpha_3^2$ then $Cx = [Q3\ Q4 - Q6\ Q1] \div [Q3\ Q5 - Q2\ Q6]$ and $Bx = [Q1 - Cx\ Q2] \div Q3$ and $Ax = X1 \div \alpha_1 - Bx\alpha_1 - Cx\alpha_1^2$ This set of Ax, Bx, and Cx values for the environmental sensor 685, 686, and 687 readings are stored in the relational database 740. Additional sets of Ax, Bx, and Cx values are determined for temperature, humidity, and plumb bob values that span the operational limits of the milling machine and are stored in the relational database 740.

Setting up a Y-axis coordinate system uses an electronic gauge block assembly 270. Y-axis processing is performed in a similar manner to X-axis processing. This completes the CAS process of determining a refined position X-axis, Y-axis and Z axis coordinate system that spans the space above the machine tool table defined by the values Xr to X3, Yr to Y3, and Zr to Z3.

Figure 12A:
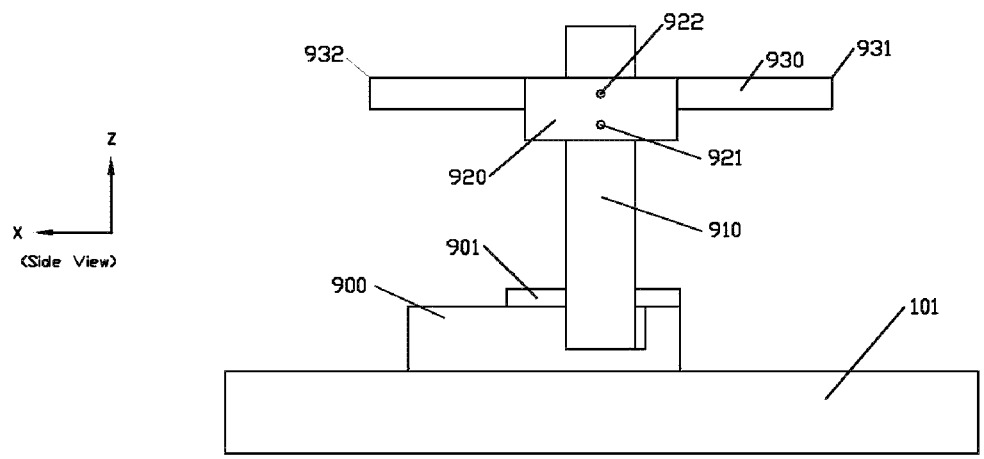
FIG. 12A is a side view of a probe engaging indexed stop.
Figure 12B:
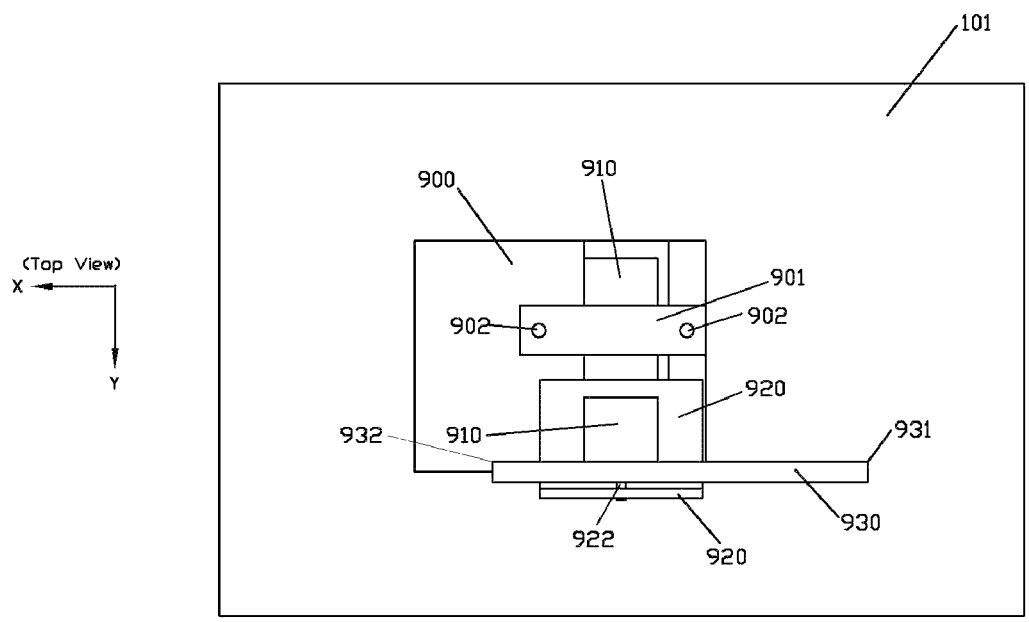
FIG. 12B is a top view of a probe engaging indexed stop.

FIG. 12A shows a side view and FIG. 12B shows a top view of a preferred embodiment of a probe engaging indexed stop 114. Base 900 is mounted on table 101, and contains a slot aligned substantially in the Y axis direction. Post 910 slides in the Y axis direction into the slot of base 900. Clamp 901 may secure the post 910 using locking screws 902. Slider 920 slides substantially in the Z axis direction on post 910 and is secured in position by locking screw 921. Bar 930 slides substantially in the X axis direction on slider 920, and is secured in position by locking screw 922.

The position of point 931 on bar 930 determines the stop position for left handed origin 117 as previously described in FIG. 1A. The position of point 932 on bar 930 may be used to determine the stop position for right handed origins such as 108 or 118 as previously described in FIG. 1A.

Figure 13A:
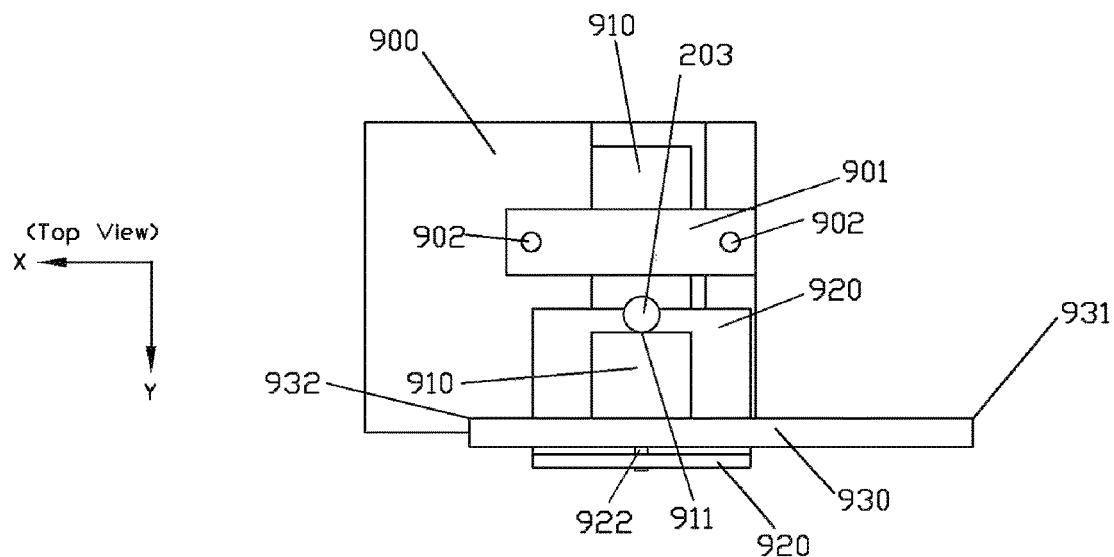
FIG. 13A is a top view of the Y and Z axis probe engagement for the probe engaging indexed stop.

FIG. 13A shows how the probe 203 cylinder side may engage post 910 at point 911 to set the Y axis position of the post 910. The bottom side of probe 203 may engage the slider 920 to set the Z axis height of slider 920.

Figure 13B:
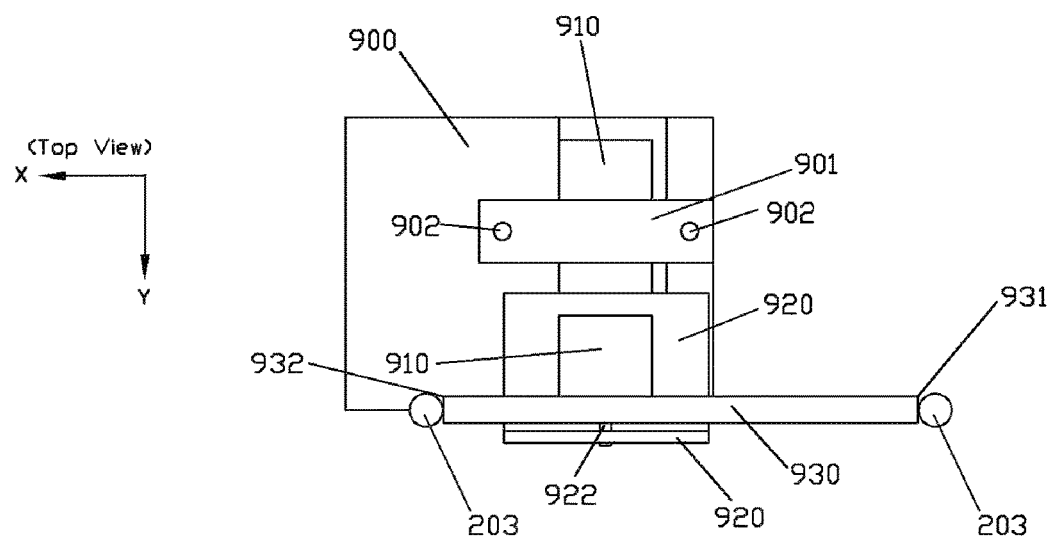
FIG. 13B is a top view of the X axis probe engagement for the probe engaging indexed stop.

FIG. 13B shows how the probe 203 cylinder side engages the bar 930 to determine the X axis position of point 931 on bar 930 for an external probe engaging indexed stop 114. The computer 700 controls the position of the probe 203 in accordance with refined position information in relational data base 740 values, in this case for a left handed origin such as origin 117. Similarly, the probe 203 cylinder side may engage the bar 930 at point 932 to determine the X axis position of point 932 for an external probe engaging indexed stop 115 useful for setting a right handed origin such as origin 118.

FIG. 13B also shows how the probe 203 cylinder side engages the bar 930 in this case at point 932 to determine the X axis position of point 931 on bar 930 for an internal probe engaging indexed stop 104. The computer 700 controls the position of the probe 203 in accordance with refined position information in relational data base 740 values, in this case for a left handed origin such as origin 107. Similarly, the probe 203 cylinder side may engage the bar 930 at point 931 to determine the X axis position of point 932 for an internal probe engaging indexed stop 105 useful for setting a right handed origin such as origin 108.

The CNC milling machine may be controlled directly by the machinist, and the probe in the tool holder replaced with a measuring probe such as an edge finder. In an alternative embodiment the reference surfaces on bars 200, 201, and 202 may be measured to determine the raw X axis, Y axis, and Z axis probe raw reference positions. The measuring probe is moved by the machinist to the raw reference positions on bars 200, 201, and 202 and the machinist stores this data in the CNC milling machine 750 memory. The computer 700 may access the CNC milling machine 750 memory to read the raw reference positions, and then follow the process above to determine the coefficients to add to the relational database 740 to specify the actual refined reference positions as related to the environmental values. The computer 700 obtains the environmental values using the electrical processing in electrical interface box 224.

This CAS process may be continued as above using the gauge blocks to specify refined reference points defining the entire coordinate system and using computer 700 to store the values in the relational database 740 along with the environmental values that span the operational limits of the milling machine which are also stored in the relational database 740.

In another manual quality control CAS process, a measuring probe such as an edge finder is loaded into the tool holder. The measuring probe is moved to an X axis probe raw fiducial position on the work piece and the machinist stores this data point in the CNC milling machine 750 memory.

The raw fiducial position may be the X axis coordinate of the X axis edge of the work piece for example. The computer 700 may access the CNC milling machine 750 memory to read the X axis raw fiducial value and also use the relational database 740 to specify the actual refined X axis fiducial position as related to the environmental values.

The computer 700 also is running the CAM process program and can access the required refined X axis fiducial position for this CAM process step. Hence the computer 700 can determine if the actual refined X axis fiducial position is within the accuracy tolerance of the required refined X axis fiducial position.

This process can be repeated for Y axis and Z axis required fiducial positions on the work piece during each step of the CAM process to provide an indication of the quality of the work piece during manufacture. In the event the accuracy tolerance is out of specification the machinist may be notified and possible corrective action taken before the part is ruined.

A particular case is when the machinist places the work piece in the vise, and the work piece does not seat properly. Seating problems occur typically when the clamping jaw of the vise forces the part out of its proper position, and also when any of the reference surfaces of the vise, parallels, and stops contain debris from the cutting material that is not properly cleaned away from the reference surfaces. When a seating problem is determined and the machinist notified prior to further cutting operations, the work piece may be properly seated and thereby saved from ruin.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

What is claimed is:

1. An apparatus to assist a machinist in the setup of a remote computer controlled machine tool table, comprising;
    an X-axis electronic gauge block assembly positioned on the machine tool table, a Y-axis electronic gauge block assembly positioned on the machine tool table, and a Z-axis electronic gauge block assembly positioned on the machine tool table, to respectively collect X-axis probe position values, Y-axis probe position values, and Z-axis probe position values;
    environmental sensors to collect environmental values;
    an electronics processing system to establish a raw X-axis probe position, a raw Y-axis probe position, and a raw Z-axis probe position derived from an X-axis offset value, the X-axis probe position values, a Y-axis offset value, the Y-axis probe position values, and a Z-axis offset value, and the Z-axis probe position values; and
    a wireless interface to transmit the environmental values, the raw X-axis probe position value, the raw Y-axis probe position value, and the raw Z-axis probe position value to the remote computer and to receive from the remote computer refined probe position values to assist the machinist in the setup of the machine tool table.

2. The apparatus of claim 1 wherein the wireless interface receives the X-axis offset value, the Y-axis offset value and the Z-axis offset value.

3. The apparatus of claim 1 wherein the environmental sensors include a temperature sensor, a humidity sensor and a planar position sensor.

4. The apparatus of claim 1 further comprising a probe in the form of a rigid gauge pin in a shrink fit machine tool holder.

5. The apparatus of claim 1 wherein:
    the X-axis electronic gauge block assembly comprises a first dual base configured for positioning on the machine tool table, with a first bar attached to the first dual base by a flexure and a push pull screw arrangement;
    the Y-axis electronic gauge block assembly comprises a second dual base configured for positioning on the machine tool table, with a second bar attached to the second dual base by a flexure and a push pull screw arrangement; and
    the Z-axis electronic gauge block assembly comprises a third dual base configured for positioning on the machine tool table, with a third bar attached to the third dual base by a flexure and a push pull screw arrangement.

6. The apparatus of claim 5 with an X-axis electronic gauge block attached to the first bar, a Y-axis electronic gauge block attached to the second bar, and a Z-axis electronic gauge block attached to the third bar, wherein the first bar, the second bar and the third bar each have reference surfaces to locate gauge blocks.

7. The apparatus of claim 6 wherein each of the X-axis electronic gauge block, Y-axis electronic gauge block and Z-axis electronic gauge block comprises:
   a tip,
   a block, wherein the tip is constrained to move in a single axis direction and the tip is sealed to the block with a flexible seal, and
   a sensor positioned within the block to sense the single axis position of the tip.

8. The apparatus of claim 1 in combination with the computer storing a relational database of coefficient values that specify a coordinate system of refined X-axis probe positions, refined Y-axis probe positions and refined Z-axis probe positions related to the environmental values.

9. The apparatus of claim 1 wherein the computer wirelessly transmits offset values and multiplexer channel selection controls to the wireless interface.

10. The apparatus of claim 8 in combination with a computer numeric controlled milling machine, the computer conveying a refined X-axis probe position, a refined Y-axis probe position and a refined Z-axis probe position to the computer numeric controlled milling machine.

11. The apparatus of claim 10 wherein the computer numeric controlled milling machine automatically moves a probe to the refined X-axis probe position, the refined Y-axis probe position and the refined Z-axis probe position.

12. The apparatus of claim 8 wherein the computer generates an alert in response to a temperature change exceeding a predetermined threshold.

13. The apparatus of claim 8 wherein the computer generates an alert in response to changing planar position values exceeding at least one predetermined threshold.

14. The apparatus of claim 1 in combination with a probe engaging indexed stop comprising:
   a base configured for mounting on the machine tool table, the base defining a slot in the Y-axis direction to receive a post,
   a slider positioned on the post, the slider being movable along the post in the Z-axis direction,
   a bar positioned on the slider, the bar being movable along the slider in the X-axis direction, the post the slider and the bar configured to engage a probe, such that when the post and the slider and the bar are clamped the bar defines the X-axis of an origin.

15. The apparatus of claim 1 further comprising a key control processor to control access to the wireless interface.

16. The apparatus of claim 8 wherein access to the relational database is controlled by a password or key.

17. The apparatus of claim 1 further comprising a display control processor to control display of the refined probe position values.

* * * * *